United States Patent
Wakahoi et al.

(10) Patent No.: US 6,849,355 B2
(45) Date of Patent: Feb. 1, 2005

(54) FUEL CELL STACK HAVING CORRECTION PLATES FOR CORRECTING DEFORMATION OF METAL SEPARATORS

(75) Inventors: Toshiya Wakahoi, Wako (JP); Junichi Sato, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 485 days.

(21) Appl. No.: 10/036,626

(22) Filed: Nov. 7, 2001

(65) Prior Publication Data

US 2002/0061430 A1 May 23, 2002

(30) Foreign Application Priority Data

Nov. 7, 2000 (JP) .................................. P2000-339639

(51) Int. Cl.[7] .............................................. H01M 2/00
(52) U.S. Cl. .............................. 429/34; 429/37; 429/38; 429/39
(58) Field of Search .............................. 429/34, 37, 38, 429/39

(56) References Cited

U.S. PATENT DOCUMENTS

2002/0045086 A1 * 4/2002 Tsuji et al. .................. 429/34

FOREIGN PATENT DOCUMENTS

JP     2000-021419      1/2000

* cited by examiner

*Primary Examiner*—Laura Weiner
(74) *Attorney, Agent, or Firm*—Lahive & Cockfield, LLP; Anthony A. Laurentano, Esq.

(57) ABSTRACT

A fuel cell stack is disclosed, which improves productivity by employing metal separators while deformation in the stacked shape can be reduced, thereby preventing the decrease of the power generating capability and the decrease of the dimensional accuracy of the fuel cell stack. The fuel cell stack comprises a plurality of stacked unit fuel cells, each comprising a membrane electrode assembly which is placed between and supported by a pair of metal separators, wherein the membrane electrode assembly has an anode, a cathode, and an electrolyte membrane which is placed between the anode and the cathode; and correction plates, made of carbon or metal, for correcting deformation of the metal separators, are inserted every predetermined number of the unit fuel cells.

6 Claims, 4 Drawing Sheets

FUEL CELL STACK HAVING CORRECTION PLATES FOR CORRECTING DEFORMATION OF METAL SEPARATORS

BACKGROUND OF THE INVENTION

1. Field of the Invention

The present invention relates to a fuel cell stack having stacked unit fuel cells, each having a membrane electrode assembly in which an anode and a cathode are provided on either side of an electrolyte membrane, and the membrane electrode assembly is placed between metal separators for supporting the membrane electrode assembly.

2. Description of the Related Art

Typically, solid polymer-type fuel cells have a membrane electrode assembly in which an anode and a cathode are provided on either side of a solid polymer electrolyte membrane consisting of a polymer ionic exchange membrane (i.e., cation exchange membrane). The membrane electrode assembly is placed between separators which are provided for supporting the membrane electrode assembly, so as to form a unit fuel cell. Generally, a specific number of unit fuel cells are stacked to obtain a fuel cell stack.

In this kind of fuel cell stack, a fuel gas supplied to the anode, such as a hydrogen gas, is ionized to hydrogen ions on catalytic electrodes, and the hydrogen ions are transferred to the cathode via an electrolyte membrane which is humidified to have an appropriate level of humidity. During this process, electrons are generated and flow to an external circuit, providing DC (direct current) electric energy. An oxidizing gas such as oxygen or air is supplied to the cathode, and the hydrogen gas, electrons, and oxygen gas react at the cathode, thereby generating water.

Generally, in such a fuel cell stack, the separators are made of carbon which has superior electric characteristics (e.g., conductivity) and superior corrosion resistance, and the separators made of carbon can be precisely manufactured. However, the thickness of a separator made of carbon is large, and the strength and productivity of such a separator are inferior. In consideration of these circumstances, metal separators have been proposed, which can be thin and be formed by press working, and high productivity can be realized. A technique related to the metal separators has been known (refer to Japanese Unexamined Patent Application, First Publication No. 2000-21419).

As shown in FIG. 4, in the fuel cell stack employing metal separators, a unit fuel cell 107 is constructed by placing a membrane electrode assembly 104 between a pair of corrugated metal separators 105 and 106, where in the membrane electrode assembly 104, a solid polymer electrolyte membrane 101 is placed between an anode 102 and a cathode 103. Plural unit fuel cells 107 are stacked in a manner such that convex portions 105a and 106a of the adjacent metal separators 105 and 106 contact each other and concave portions 105b and 106b of the adjacent metal separators 105 and 106 face each other.

Here, each space between the concave portions 105b and 106b (which face each other) of the metal separators 105 and 106 is used as a passage 109 through which a cooling medium flows. In addition, each space between the anode 102 and a concave portion 105c which is a reverse side of the convex portion 105a of the metal separator 105 is used as a passage 110 through which a fuel gas flows. Similarly, each space between the cathode 103 and a concave portion 106c which is a reverse side of the convex portion 106a of the metal separator 106 is used as a passage 111 through which an oxidizing gas flows.

However, the metal separators made by press working tend to be deformed and to have an error in shape such as a camber or waviness, and consequently, necessary flatness may not be obtained. In particular, if a load is imposed due to fastening on the fuel cell stack, the unit fuel cells 107 including the metal separators may become cambered or the unit fuel cells 107 may be deformed. Consequently, the pressure imposed on each electrode surface of the anode and cathode adjacent to the deformed portion is not uniform, so that the contact resistance increases and the internal resistance of the fuel cell also increases. Accordingly, required performance of the fuel cell stack cannot be obtained. In addition, it is difficult to maintain required sealing capability between the metal separators. Furthermore, the above-explained errors in shape are cumulative due to a stacked structure, thereby reducing the dimensional accuracy of the fuel cell stack.

SUMMARY OF THE INVENTION

In consideration of the above circumstances, an object of the present invention is to provide a fuel cell stack for improving productivity by employing metal separators while deformation in the stacked shape can be reduced, thereby preventing the decrease of the power generating capability and the decrease of the dimensional accuracy of the fuel cell stack.

Therefore, the present invention provides a fuel cell stack comprising:

a plurality of stacked unit fuel cells (e.g., unit fuel cells 17 in an embodiment explained below), each comprising a membrane electrode assembly (e.g., membrane electrode assembly 14 in the embodiment explained below) which is placed between and supported by a pair of metal separators (e.g., metal separators 15 and 16 in the embodiment explained below), wherein the membrane electrode assembly has an anode (e.g., anode 12 in the embodiment explained below), a cathode (e.g., cathode 13 in the embodiment explained below), and an electrolyte membrane (e.g., solid polymer electrolyte membrane 11 in the embodiment explained below) which is placed between the anode and the cathode; and correction plates (e.g., correction plates 50; 53, 54 in the embodiment explained below), made of carbon or metal, for correcting deformation of the metal separators, are inserted every predetermined number of the unit fuel cells.

Preferably, the correction plates have rigidity suitable for correcting deformation of the metal separators.

The correction plates may function as separators of a portion of the unit fuel cells.

A passage into which a fuel gas is supplied may be formed in the correction plates. Similarly, a passage into which an oxidizing gas is supplied may be formed in the correction plates. Also similarly, a passage into which a coolant is supplied may be formed in the correction plates.

Accordingly, the correction plates made of carbon or metal are inserted every predetermined number of the unit fuel cells; thus, deformation of the metal separators, such as a camber or waviness, can be corrected, and required flatness can be obtained. Therefore, the pressure imposed on the surface of the anode adjacent to the metal separator and the pressure imposed on the surface of the cathode adjacent to the metal separator are uniform; thus, the contact resistance can decrease and the internal resistance of the fuel cell can also decrease. In addition, it is possible to obtain necessary sealing capability between the metal separators, thereby preventing the power generating capability from decreasing. Furthermore, even in a stacked structure, cumulative errors in the shape are small, thereby preventing the dimensional accuracy of the fuel cell stack from decreasing.

Accordingly, deformation of the stacked metal separators can be reduced and decrease of the power generating capability and decrease of the dimensional accuracy of the fuel cell stack can be prevented while productivity can be improved.

DESCRIPTION OF THE PREFERRED EMBODIMENTS

Hereinafter, an embodiment of the fuel cell stack according to the present invention will be explained in detail with reference to FIGS. 1 to 3.

Figure 1:
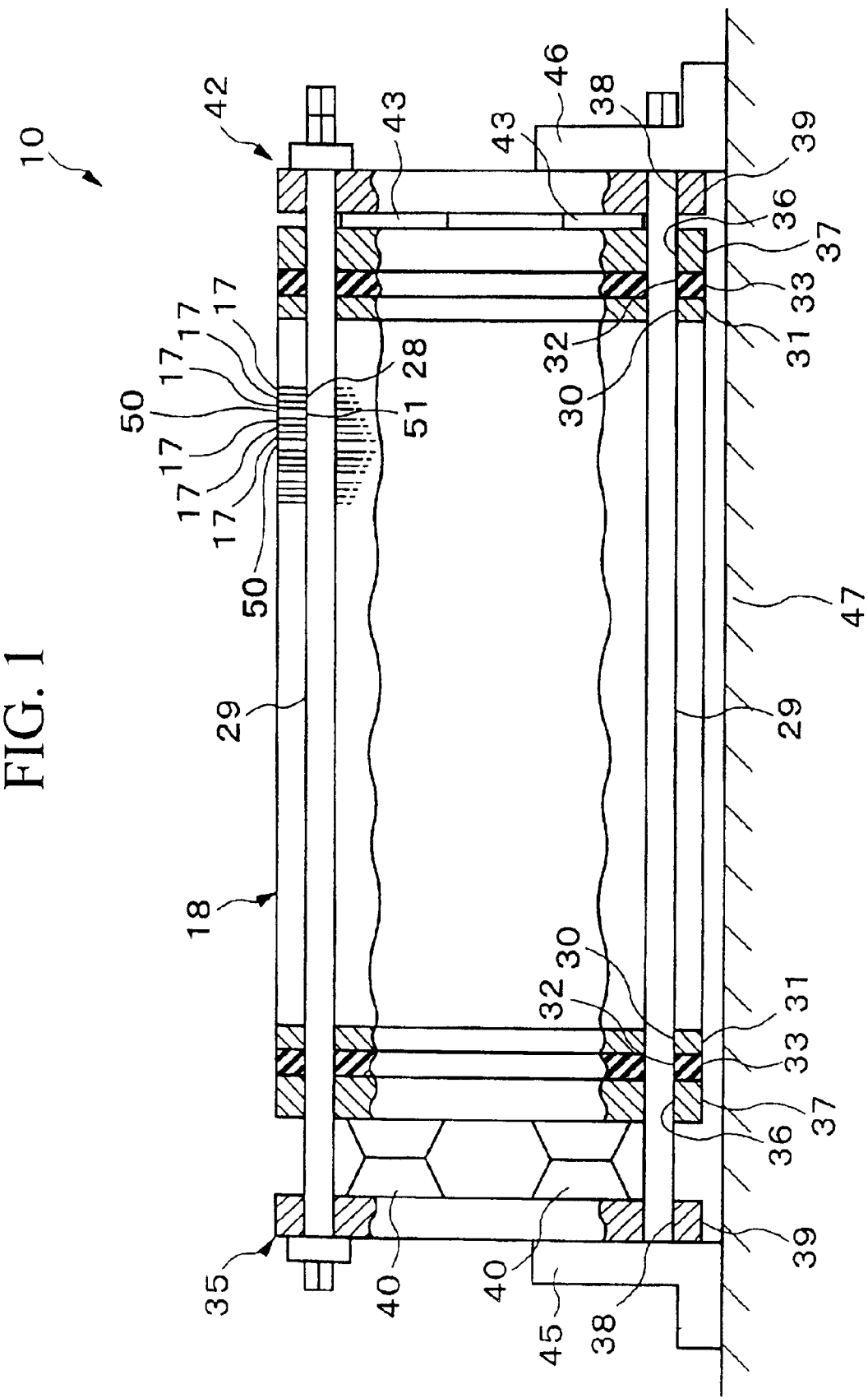
FIG. 1 is a cross-sectional side view showing the fuel cell stack built in a vehicle, as an embodiment of the present invention.
Figure 2:
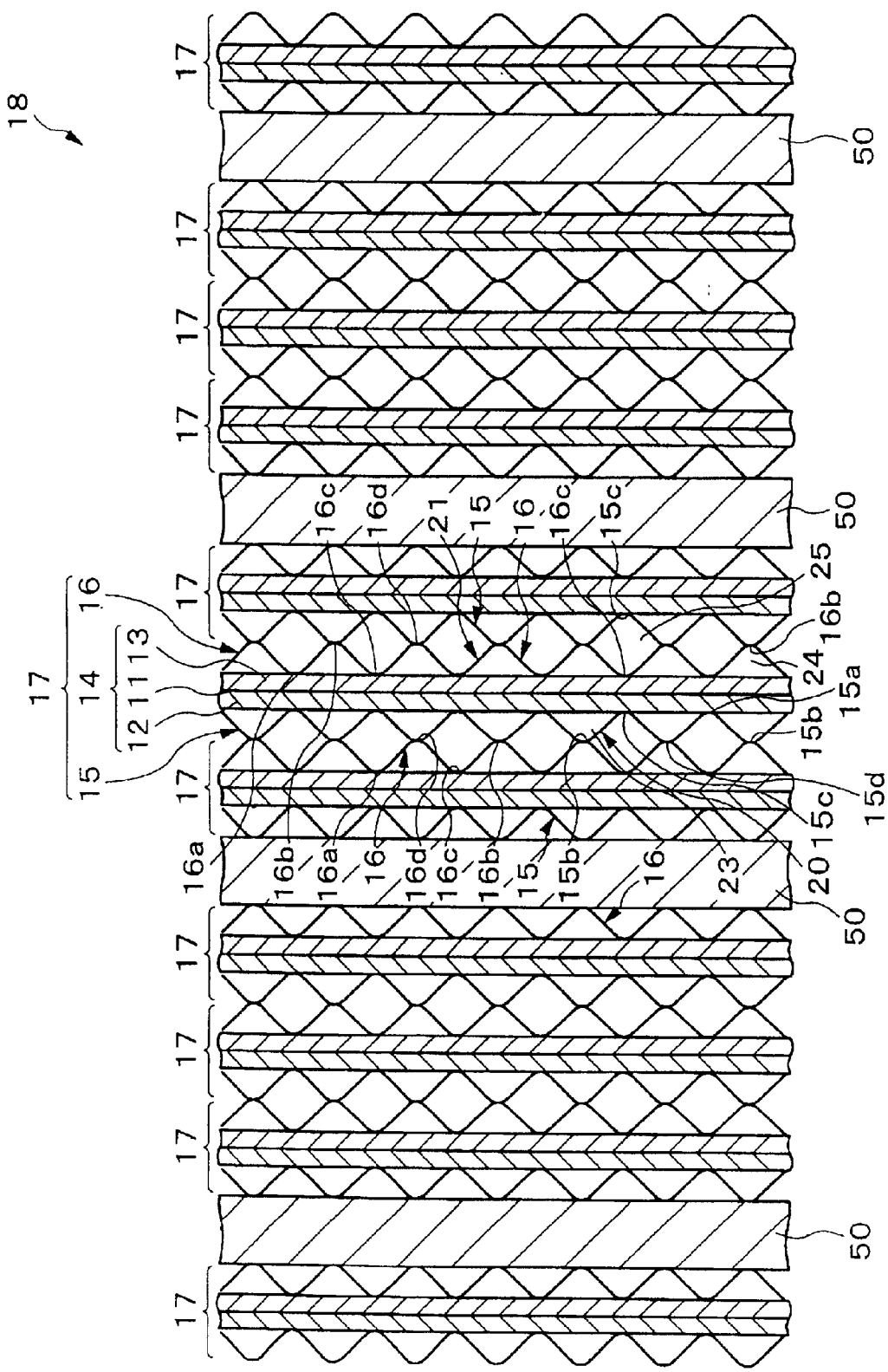
FIG. 2 is a partially-enlarged sectional view showing an example of the stacked body of the fuel cell stack in the embodiment.

FIG. 1 shows the structure of a fuel cell stack 10 of the present embodiment, which is built into a vehicle. As shown in FIG. 2, a unit fuel cell 17 is constructed by placing a membrane electrode assembly 14 between a pair of metal separators 15 and 16, which are arranged in the direction of the thickness of the fuel cell stack and which support the membrane electrode assembly 14. In the membrane electrode assembly 14, a solid polymer electrolyte membrane 11 (corresponding to the electrolyte membrane of the present invention) is placed between an anode 12 and a cathode 13 which are also arranged in the direction of the thickness of the fuel cell stack. A plurality of the unit fuel cells 17 are stacked in the direction of the thickness so as to form a stacked body 18, and electric power is taken from either side of the stacked body.

The pair of the metal separators 15 and 16 are formed by punching, for example, a stainless-steel plate having a thickness of 0.1 to 0.5 mm in the press working, and by bending the punched plates. In a central area of each metal separator 15, a corrugated portion 20 is formed, in which convex portions 15a and concave portions 15b are alternately formed. Similarly, in a central area of each metal separator 16, a corrugated portion 21 is formed, in which convex portions 16a and concave portions 16b are alternately formed. In addition to the above-explained stainless-steel plate, a stainless-steel plate whose surface is coated with a corrosion-resisting material may be used for making the metal separators 15 and 16.

The convex portions 15a of the metal separator 15 are made to contact the anode 12, and the concave portions 15b are made to face the anode 12.

Similarly, the convex portions 16a of the metal separator 16 are made to contact the cathode 13, and the concave portions 16b are made to face the cathode 13.

When the unit fuel cells are stacked in the direction of the thickness of the fuel cell stack, the metal separators 15 and 16 are adjacent to each other. In this process, the metal separators 15 and 16 are stacked in a manner such that the concave portions 15c which are the reverse side of the corresponding convex portions 15a of the metal separator 15 and the concave portions 16c which are the reverse side of the corresponding convex portions 16a of the metal separator 16 face each other, and the convex portions 15d which are the reverse side of the corresponding concave portions 15b of the metal separator 15 and the convex portions 16d which are the reverse side of the corresponding concave portions 16b of the metal separator 16 contact each other.

In this stacked form, each space between the anode 12 and the concave portion 15b of the metal separator 15 (which is adjacent to the anode) is used as a fuel gas passage 23 into which hydrogen is supplied. Similarly, each space between the cathode 13 and the concave portion 16b of the metal separator 16 (which is adjacent to the cathode) is used as an oxidizing gas passage 24 into which air is supplied. In addition, each space between the concave portions 15c and 16c of the metal separators 15 and 16, which face each other, is used as a cooling medium passage 25 into which coolant is supplied, thereby cooling the membrane electrode assembly 14.

As shown in FIG. 1, the unit fuel cells 17, each having the membrane electrode assembly 14 and a pair of the metal separators 15 and 16, are fastened together in the stacking direction from either side by using stud bolts 29. These stud bolts 29 are inserted through insertion holes 28 through the unit fuel cells 17. In addition, electrode plates 31 are provided at either side of the stacked body 18 (consisting of the stacked unit fuel cells 17), and insertion holes 30 through which the stud bolts 29 pass are provided through the electrode plates 31.

At the outer side of one of the electrode plates 31, a fastening mechanism (or structure) 35 is provided via an insulating plate 33 along the stacking direction, where the insulating plate 33 has insertion holes 32 through which the stud bolts 29 pass.

The fastening mechanism 35 has an end plate 37 having insertion holes 36 through which the stud bolts 29 pass, a backup plate 39 having insertion holes 38 through which the stud bolts 29 pass, and disc springs 40 inserted between the end plate 37 and the backup plate 39.

At the outer side of the other electrode plate 31, a fastening mechanism (or structure) 42 is provided via an insulating plate 33 along the stacking direction, where the insulating plate 33 has insertion holes 32 through which the stud bolts 29 pass.

The fastening mechanism 42 has an end plate 37 having insertion holes 36 through which the stud bolts 29 pass, a backup plate 39 having insertion holes 38 through which the stud bolts 29 pass, and a cushioning member 43 such as a washer, which is inserted between the end plate 37 and the backup plate 39.

The fastening mechanisms 35 and 42 provide desired fastening force to the stacked body 18. That is, the backup plates 39 at either end in the stacking direction are fastened together by using the stud bolts 29, so that the fastening mechanism 35 including one of the backup plate 39 and the fastening mechanism 42 including the other backup plate 39 fasten the stacked body 18.

An attachment member 45 for building the fuel cell stack into the vehicle body is attached to the backup plate 39 of the fastening mechanism 35. A similar attachment member 46 for building the fuel cell stack into the vehicle body is attached to the backup plate 39 of the fastening mechanism 42. These attachment members 45 and 46 are fastened to a panel 47 of the vehicle body.

In the above explanation, the attachment members 45 and 46 are attached to the backup plates 39 of the fastening mechanisms 35 and 42; however, the attachment members 45 and 46 may be attached to the end plates 37 which are placed at outer sides of the electrode plates 31.

Also in the present embodiment, correction plates 50 made of carbon are inserted inside the stacked body 18 at specific intervals of the stacked unit fuel cells 17, each having the membrane electrode assembly 14 and a pair of the metal separators 15 and 16 provided at either side of the membrane electrode assembly 14. More specifically, in FIG. 1, the correction plates 50 are inserted every three unit fuel cells along the stacking direction. That is, a predetermined number of successive unit fuel cells 17 (in FIG. 1, three unit fuel cells 17) are grouped, and a correction plate 50 is inserted between the adjacent groups. The correction plate 50 also has insertion holes 51 through which the stud bolts 29 pass.

The above predetermined number of grouped unit fuel cells 17, that is, the pitch of the inserted correction plates 50, is not limited to 3, but may be less than 3 or more than 3.

The thickness of the correction plate 50 is approximately 0.5 to 1.5 mm, and the correction plate 50 has rigidity so as to correct deformation of the metal separators 15 and 16. The correction plate 50 may have a ribbed structure and may be made of metal, rather than carbon. The thickness of a metal correction plate 50 can also be approximately 0.5 to 1.5 mm, and the metal correction plate 50 can have rigidity so as to correct deformation of the metal separators 15 and 16. Such a metal correction plate 50 may be a stainless-steel plate, whose surface may be coated with a corrosion-resistant material.

When the stacked body 18, in which the correction plates 50 made of carbon are inserted inside the stacked body at a specific pitch, is fastened from both fastening mechanisms 35 and 42 by using the stud bolts 29, the metal separators 15 and 16 at either side of each correction plate 50 follow the shape of this correction plate 50 (which the metal separators 15 and 16 contact), so that deformation of these metal separators such as camber or waviness is corrected, and required flatness can be obtained. In addition, the other metal separators 15 and 16 which do not directly contact the correction plates 50 follow the corrected metal separators 15 and 16, so that the flatness of the other metal separators 15 and 16 can also be improved. As a result, the pressure imposed on the surface of the anode 12 adjacent to the metal separator 15 and the pressure imposed on the surface of the cathode 13 adjacent to the metal separator 16 are uniform; thus, the contact resistance can decrease and the internal resistance of the fuel cell can also decrease. In addition, it is possible to obtain necessary sealing capability between the metal separators, thereby preventing the power generating capability from decreasing. Furthermore, even in a stacked structure, cumulative errors in the shape are small, thereby preventing the dimensional accuracy of the fuel cell stack from decreasing.

As explained above, the usage of the metal separators 15 and 16 can improve the productivity, and deformation of the stacked metal separators 15 and 16 can be reduced, thereby preventing the decrease of the performance of the power generation and the decrease of the dimensional accuracy of the fuel cell stack.

Figure 3:
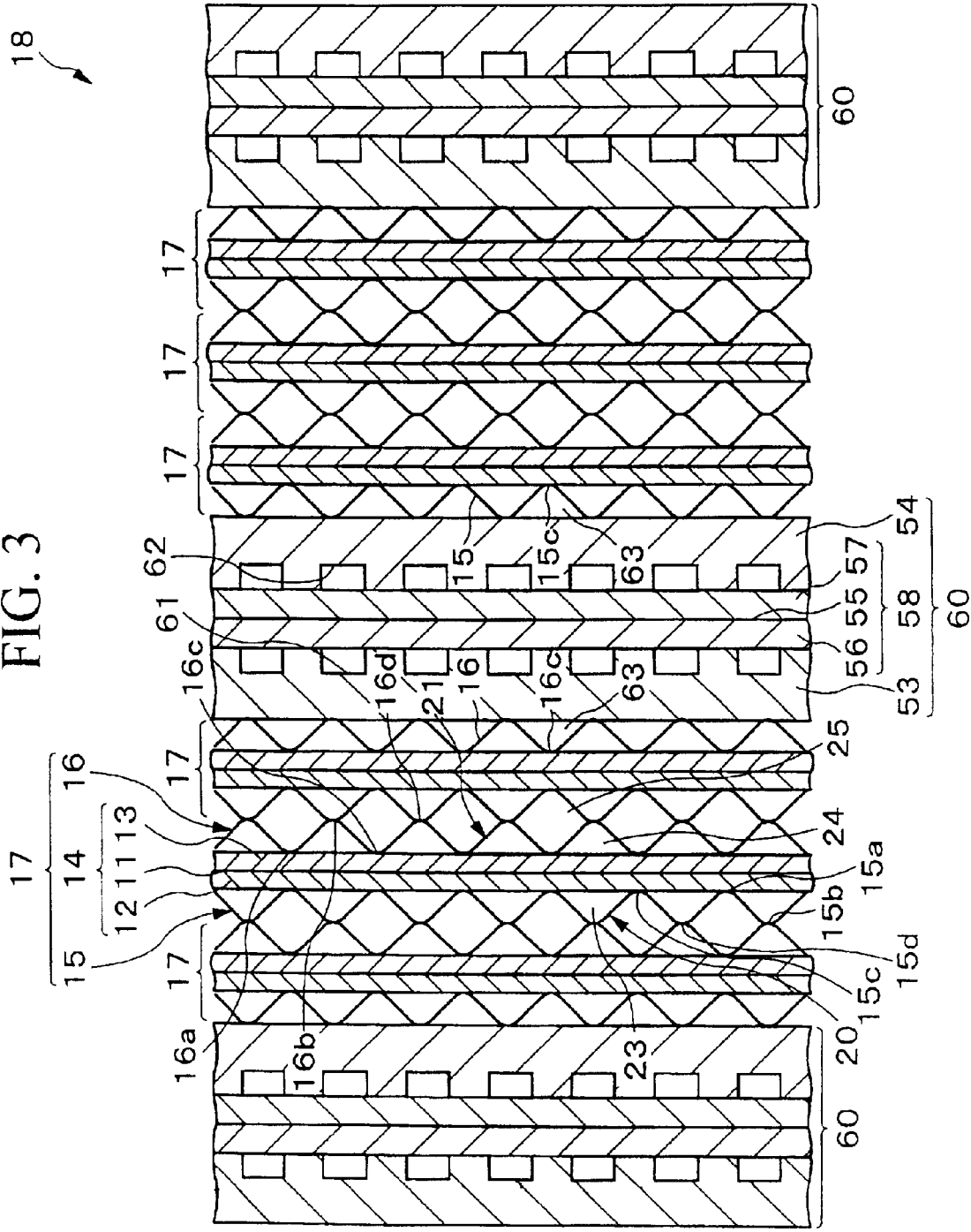
FIG. 3 is a partially-enlarged sectional view showing another example of the stacked body of the fuel cell stack in the embodiment.
Figure 4:
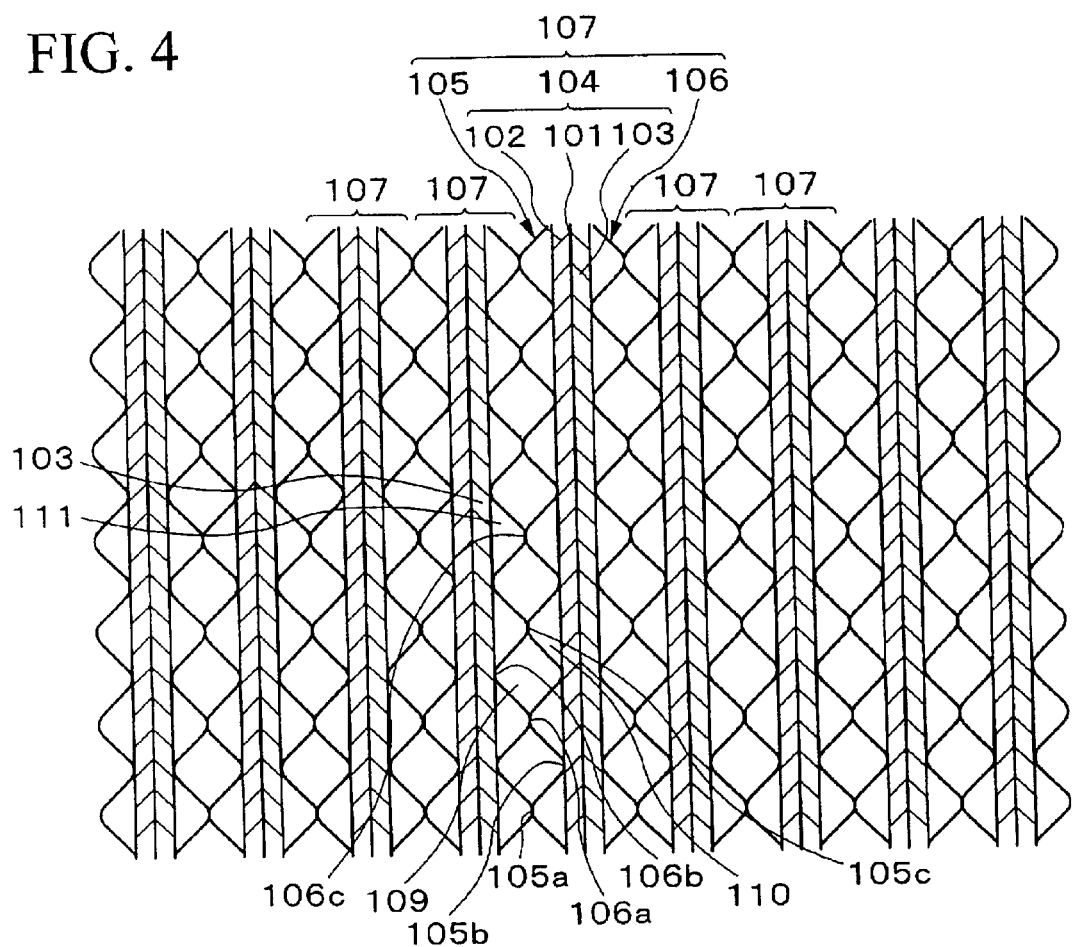
FIG. 4 is a partially-enlarged sectional view showing an example of the stacked body of a conventional fuel cell stack.
Figure 5:
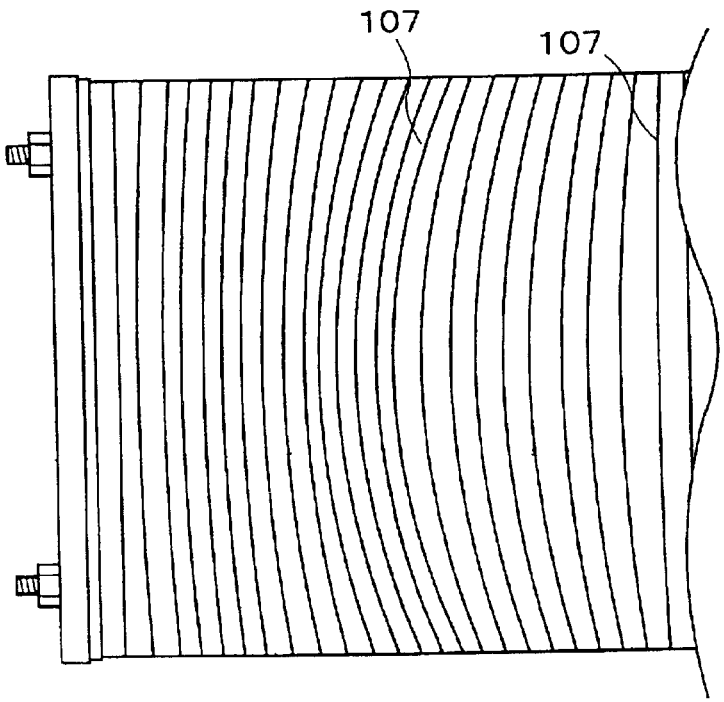
FIG. 5 is a side view showing a deformed state of the unit fuel cells in the conventional fuel cell stack.

The above-explained embodiment can be modified as shown in FIG. 3. That is, a pair of correction plates 53 and 54 made of carbon is employed in place of the correction plate 50; thus, the correction plates 53 and 54 are inserted every predetermined number of unit fuel cells (here, three unit fuel cells) along the stacking direction. Here, this pair of the correction plates 53 and 54 is used as a separator, in which a solid polymer electrolyte membrane 55 is placed between an anode 56 and a cathode 57 so as to form a membrane electrode assembly 58, and this membrane electrode assembly 58 is placed between the correction plates 53 and 54. That is, this fuel cell stack also has a unit fuel cell 60 consisting of the membrane electrode assembly 58 and a pair of the correction plates 53 and 54.

According to the above structure, the correction plates 53 and 54, which can correct deformation (such as a camber or waviness) of the metal separators 15 and 16, can also be used as separators of the unit fuel cell 60. Also in this case, the thickness of each correction plate 53 or 54 is approximately 0.5 to 1.5 mm, and the correction plate has rigidity suitable for correcting deformation of the metal separators 15 and 16. In addition, the correction plates 53 and 54 may have a ribbed structure and may be made of metal instead of carbon. The thickness of each metal correction plate 53 or 54 is also approximately 0.5 to 1.5 mm, and the correction plate has rigidity suitable for correcting deformation of the metal separators 15 and 16. Typically, the correction plate is made of a stainless steel, or such a stainless-steel correction plate may be coated with a corrosion-resistant material.

In this variation shown in FIG. 3, fuel gas passages 61, into which hydrogen is supplied, are formed in the correction plate 53 which contacts the anode 56 of the unit fuel cell 60, and oxidizing gas passages, into which air is supplied, are formed in the correction plate 54 which contacts the cathode 57. The concave portions 15c and 16c of the metal separators 15 and 16, which respectively face the back faces of the correction plates 53 and 54, function as cooling medium passages 63 into which a coolant is supplied. However, in addition to these cooling medium passages 63, other cooling medium passages may be provided in the back faces of the correction plates 53 and 54.

Instead of the above structure in which the unit fuel cell 60 is made using the correction plates 53 and 54 which correct deformation of metal separators 15 and 16, the following variations are also possible: (i) passages into which hydrogen gas or air is supplied are formed in correction plates for correcting deformation of the metal separators 15 and 16, (ii) passages into which a coolant is supplied are formed in correction plates for correcting deformation of the metal separators 15 and 16, (iii) passages into which hydrogen gas or air is supplied and passages into which a coolant is supplied are both formed in correction plates for correcting deformation of the metal separators 15 and 16, and in these cases, the correction plates do not function as separators.

What is claimed is:
1. A fuel cell stack comprising:
   a plurality of stacked unit fuel cells, each comprising a membrane electrode assembly which is placed between and supported by a pair of metal separators, wherein the membrane electrode assembly has an anode, a cathode, and an electrolyte membrane disposed between the anode and the cathode; and
   one or more correction plates, made of one of carbon and metal, for correcting deformation of the metal separators, said correction plates being inserted every predetermined number of the plurality of stacked unit fuel cells.

2. A fuel cell stack as claimed in claim 1, wherein the correction plates have rigidity suitable for correcting deformation of the metal separators.

3. A fuel cell stack as claimed in claim 1, wherein the correction plates function as separators of a portion of the unit fuel cells.

4. A fuel cell stack as claimed in claim 1, wherein a passage into which a fuel gas is supplied is formed in the correction plates.

5. A fuel cell stack as claimed in claim 1, wherein a passage into which an oxidizing gas is supplied is formed in the correction plates.

6. A fuel cell stack as claimed in claim 1, wherein a passage into which a coolant is supplied is formed in the correction plates.

* * * * *